March 27, 1934. G. J. ECKER 1,952,425
REAMING TOOL
Filed March 11, 1930 3 Sheets-Sheet 1
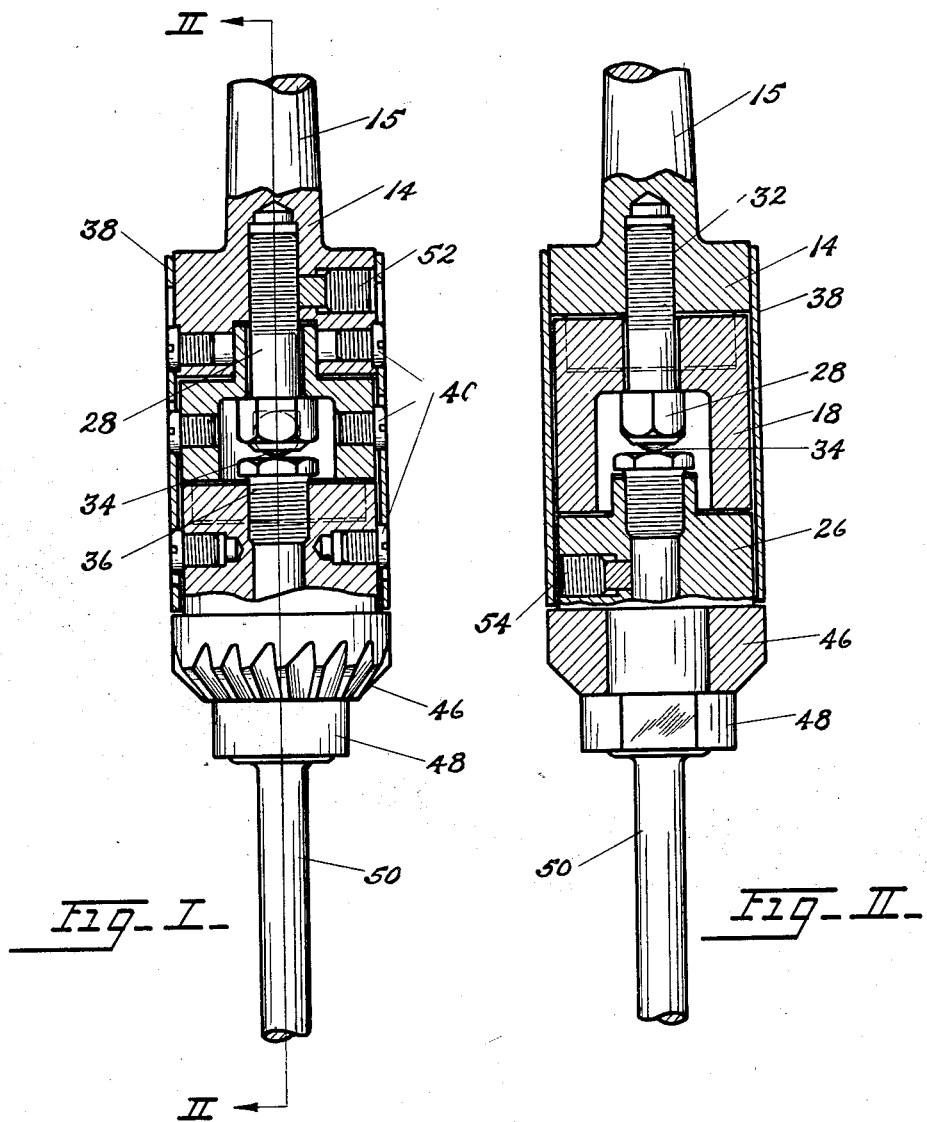
INVENTOR.
GUSTAVE J. ECKER.
BY Warren T. Hunt
ATTORNEY.

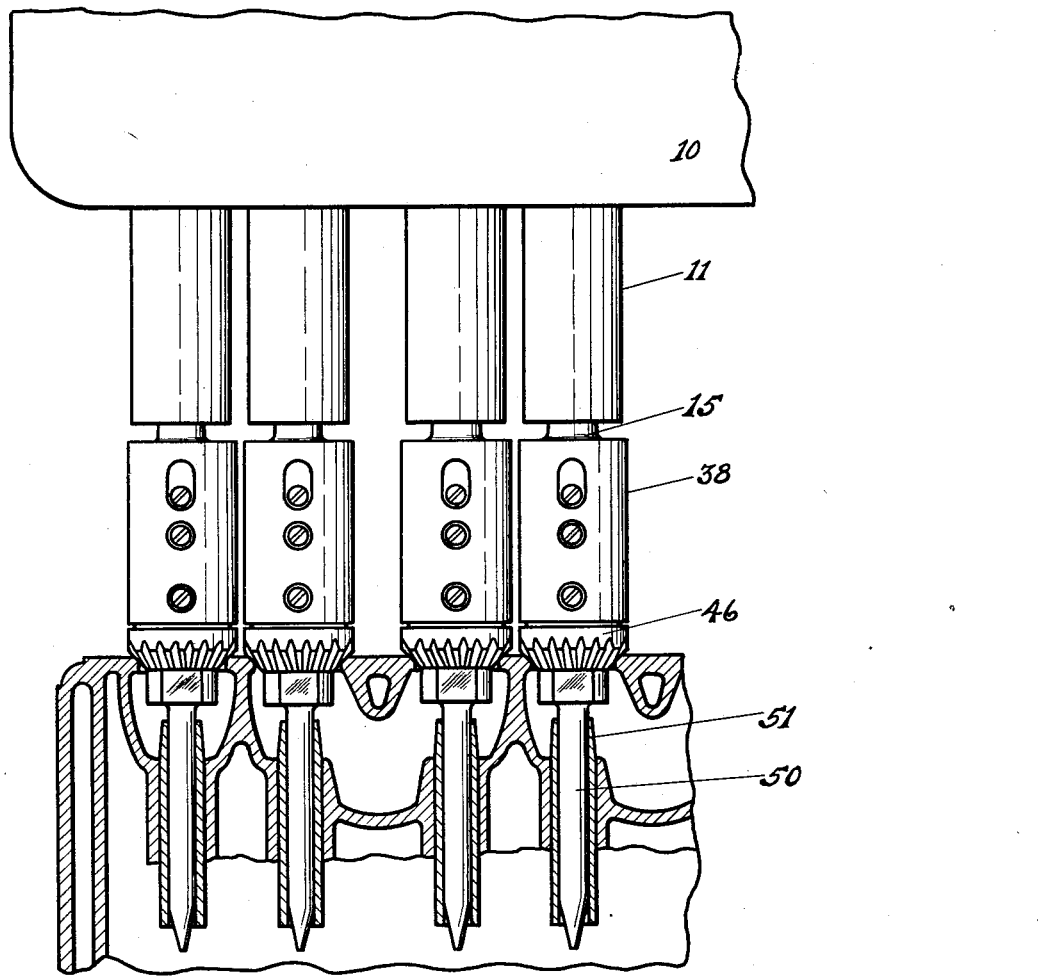
Fig. III.

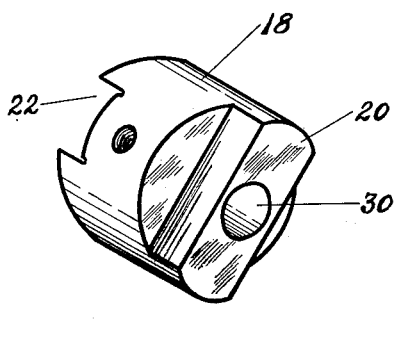
Fig. V.
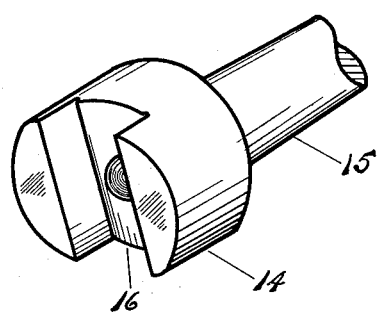
Fig. IV.
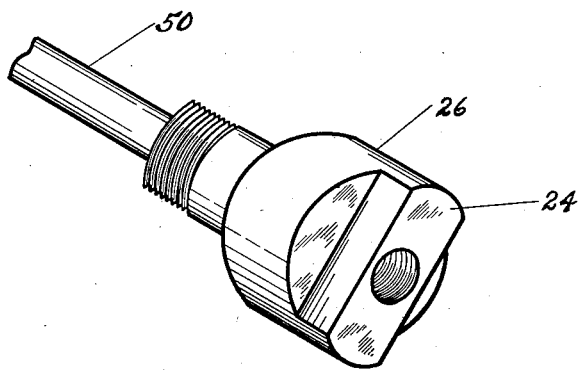
Fig. VI.
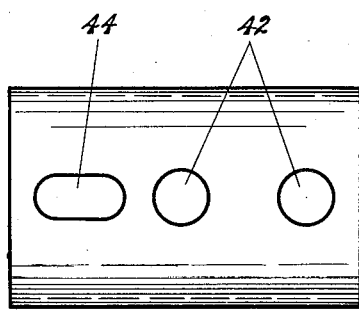
Fig. VII.
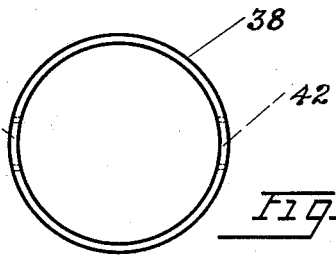
Fig. VIII.
INVENTOR.
GUSTAVE J. ECKER.
BY Warren T. Hunt
ATTORNEY.

Patented Mar. 27, 1934

1,952,425

UNITED STATES PATENT OFFICE 1,952,425

REAMING TOOL

Gustave J. Ecker, Toledo, Ohio, assignor to The Willys-Overland Company, Toledo, Ohio Application March 11, 1930, Serial No. 434,930

8 Claims. (Cl. 279—16)

This invention relates to cutting tools and more particularly to reamers that are adapted to the reaming of valve seats.

One of the objects of the invention is to provide a reaming tool which may be used in gangs for simultaneously reaming the valve seats in a multi-cylinder engine block.

Another object of the invention is to provide a tool that will enable engine valve seats to be reamed by commercial machine tools having multiple spindles.

Another object of the invention is to provide a valve reaming tool that may be used for reaming the valve seats of multi-cylinder engines and which will permit of slight misalignments between the axis of the reaming tool and the axis of the driving spindle.

Another object of the invention is to provide a reamer that will enable multi-cylinder engines, having previously formed valve guides, to have the valve seats reamed by commercial multi-spindle machine tools.

Heretofore it has been customary to ream the valve seats on multi-cylinder engines by hand reamers, which method has been necessary because of variations in the center distances between the valve centers of the cylinder blocks. The cylinder blocks ordinarily have the valve stem guides installed in them prior to the reaming of the valve seat, and the guides are used as liners to support the reamer and cause it to form the seat concentric with the guide. It is difficult to maintain the center distances of the valve guides with extreme accuracy, and because accuracy is not important to the function of the engine, somewhat wide tolerances in valve guide centers are permitted. This is not in itself objectionable, but it does entail difficulties when an attempt is made to simultaneously machine a number of valve seats.

Commercial machine tools having multiple spindles ordinarily have their spindle centers fixed, or movable with great difficulty. The present invention allows these fixed spindle machines to be used in machining multiple valve seats with center distances at variance with the center distances of the spindles, and accomplishes this result by a novel driving means which permits of a slight universal action.

The invention in its major aspect comprises a driving member, a universal joint block, a driven reamer member, and a casing which holds all three members in assembled movable relation, and also permits the reamer assembly to be inserted in the work and to be withdrawn therefrom as a unit.

A better understanding of the invention may be had by reference to the accompanying drawings, illustrating one embodiment of the invention, in which:

Figure I is an elevational view partly in section of the assembled reamer.

Fig. II is a sectional view taken along the line II—II of Figure I.

Fig. III is an elevational view of a gang of four reamer units shown in position on a fixed spindle machine and inserted in the valve guides of an engine block.

Fig. IV is a perspective view of the driving element.

Fig. V is a perspective view of the universal joint block.

Fig. VI is the perspective view of the reamer element to which the cutting tool is secured.

Fig. VII is a view of the casing.

Fig. VIII is an end view of the casing shown in Fig. VII.

Referring to the drawings, 10 is an ordinary multi-spindle machine tool, which is well known and which forms no part of the invention. One of the improved reamers is inserted in each spindle 11 of the machine tool as shown in Fig. III. The reaming tool is comprised of a driving member 14, having a tapered portion 15 adapted to be inserted in the driving spindle 11. The lower portion of the driving spindle is cylindrical in form and is provided with a slot 16 in its lower surface. A universal block 18, having a slightly less diameter than the lower portion 14 of the driving member is provided with a key member 20 which meshes with slot 16 and is adapted to slide radially therein. The block is also provided with a slot 22, formed at right angles to the key 20, and adapted to receive key 24 of the driven reamer member 26 in slidable relation thereto. Reamer member 26 is also of slightly smaller diameter than the driving member 14, for a purpose hereinafter explained. The block 18 is preferably held in assembled relation to driving member 14 by means of a bolt 28 which passes through a clearance hole 30 and engages threaded portion 32 of the driving member. Bolt 28 is also provided with a movable ball 34 which is retained in the socket formed in the head of the bolt and acts as a thrust member for transmitting thrust forces from the driving member 14 direct to the reamer member through a screw 36 which is threaded into the driven member. A casing 38 surrounds the driving member 14, block 18 and reamer member 26, and is secured to each of these parts by screws 40 which are threaded into the respective parts with their heads projecting into clearance holes 42 and 44. Casing 38 has preferably a sliding fit upon the driving member 14 and has a slight clearance of approximately 1/32 inch between it and the block 18, and the driven reamer member 26. The removable cutting tool 46 is secured upon the lower portion of the driven member 26 by means of a nut 48, the lower portion of the driving member being projected to form a stem 50 which is adapted to be inserted in the valve guide 51 of the engine block in order to hold the reamer concentric with the guide.

Care should be taken to see that the bolt 28 is not screwed down to its full depth, for in the operation of the tool it is intended that block 18 shall be freely movable with respect to both the driving and driven members. Both the block 18 and the driven member 26 are freely movable radially in the casing to the extent of the clearance between them and the casing and are also movable axially until the heads of bolts 40 engage the seats of the clearance holes 42. Hole 44 is preferably formed as an elongated slot for adjustment of the casing 28 with reference to the driving member 14 but if desired the slot 44 may be of the same width as the diameter of the screws 40, for it is not necessary that the casing 38 move relative to driving member 14. The bolt 28 and the bolt 36 are disposed centrally of their respective members and engage one another in the operative position of the tool. The engagement of the bolts allows the application of pressure from the driving member 14 direct to the reamer member 26, without cramping the joint member 18 and interfering with the universal action, the ball 34 being used as a thrust member to reduce the friction. Both bolt 28 and bolt 36 may be adjusted because of their threaded relation with their respective parts, and when the desired position is attained bolt 28 may be locked in position by lock screw 52, and bolt 36 may be locked in position by lock screw 54. Ordinarily a clearance of 1/32 inch or slightly less between block 18 and casing 38, and between reamer member 26 and casing 38 will be sufficient, for it has been found that this movement will take care of the variations in center distances that occur in engines as they are customarily received. The variation of valve center distances is ordinarily less than 1/32 inch, but this has heretofore been enough variation to prevent gang reaming of valve seats. The reamer herein described is not affected by slight variations in center distance and will be found to have sufficient universal action to permit multi-cylinder engines to have their valve seats reamed simultaneously by commercial multi-spindle machines.

While I have shown and described in considerable detail a specific embodiment of my invention, it is to be understood that this showing and description is illustrative only, and that I do not regard the invention as limited to the details of construction illustrated or described, except insofar as I have included such limitation within the terms of the following claims, in which it is my intention to claim all novelty inherent in my invention broadly as well as specifically.

I claim:

1. A device of the character disclosed, comprising in combination, a driving member; a tool driven thereby; a flexible joint connecting said driving member and tool; a casing surrounding said driving member and tool having openings in the walls thereof, said driving member and tool having projections extending into said openings whereby limited relative movement is permitted between said member and tool.

2. In a device of the character disclosed, comprising in combination, a driving member; a tool driven thereby; a universal joint forming an operative connection between said driving member and said tool; a cylindrical casing surrounding the member and tool having openings in the wall thereof, said driving member and tool having projections cooperating with the openings in said casing providing limited lost motion between said driving member and tool, and thrust members interposed between said driving member and tool, said thrust members being supported independently of the universal joint.

3. In a device of the character disclosed, comprising in combination, a driving member; a tool driven thereby; a universal joint forming an operative connection between said driving member and said tool; a cylindrical casing surrounding the member and tool having openings in the wall thereof, said driving member and tool having projections cooperating with the openings in said casing providing limited lost motion between said driving member and tool, and thrust members interposed between said driving member and tool, said thrust members being supported independently of the universal joint, one of said thrust members being adjustable for limiting the relative axial movement between said driving member and said tool.

4. In a device of the character disclosed, comprising in combination, a driving member; a tool driven thereby; a universal joint forming an operative connection between said driving member and said tool; a cylindrical casing surrounding the member and tool having openings in the wall thereof, said driving member and tool having projections cooperating with the openings in said casing providing limited lost motion between said driving member and tool; an anti-friction thrust arrangement interposed between said driving member and tool for absorbing the driving thrust, said thrust arrangement being supported independently of said universal joint.

5. A device of the character disclosed comprising a driving member; a universal joint block cooperating therewith; a bolt passing through said block securing the same in assembled movable relation to said member, said block having cooperative relation with a tool, and a thrust member carried by said bolt and adapted to abut the tool.

6. In a device of the character disclosed, comprising a driving member; a member adapted to be driven thereby; a tool carried by said driven member; a universal joint block operatively connecting said driving and driven members; and thrust members adjustably supported on said driving and driven members and interposed therebetween for limiting the relative axial movement of said members, one of said thrust members having a shoulder for securing said universal joint block in assembled movable relation to said driving member.

7. A device of the character disclosed, comprising a driving member; a tool adapted to be driven thereby; a joint operatively connecting said driving member and tool, said joint being adapted to transmit driving force irrespective of the axial alignment of said joint and tool, said joint including a universal joint block; an adjustable thrust member carried by the driving member and interposed between said driving member and the tool, said thrust member having a shoulder for securing said universal joint block in assembled relation to said driving member.

8. A device of the character disclosed, comprising a driving member; a tool adapted to be driven thereby; a block inter-connecting said driving member and tool, said block being radially slidable with respect to said driving member, and radially slidable with respect to the tool substantially in a direction at right angles to the first slidable relation; a sleeve surrounding said member and block for limiting the sliding action of said block; and thrust means including a threaded member supported by said driving member and interposed between said driving member and the tool, said threaded member having a shoulder engageable with said block for retaining the latter in assembled movable relation to said driving member.

GUSTAVE J. ECKER.